Jan. 14, 1941.                J. LIND                  2,228,833
                            BEAN CLEANER
                        Filed May 27, 1938        2 Sheets-Sheet 1
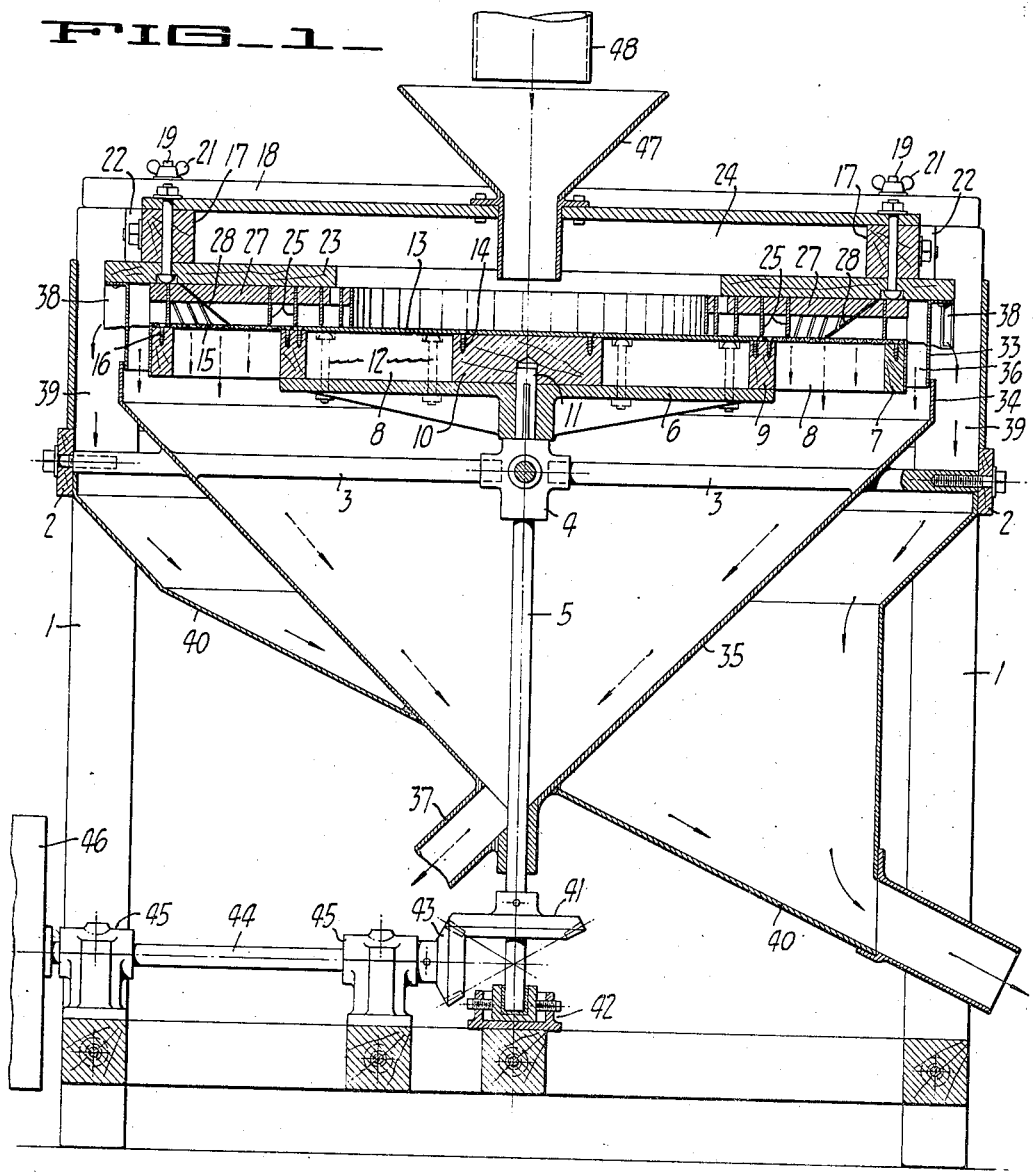
FIG_1_
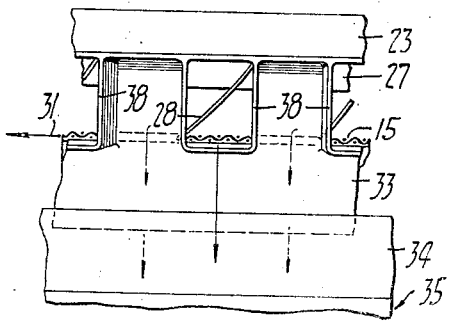
FIG_5_
INVENTOR.
John Lind
BY Boyken & Mohler
ATTORNEYS.

Jan. 14, 1941.  J. LIND  2,228,833
BEAN CLEANER
Filed May 27, 1938  2 Sheets-Sheet 2
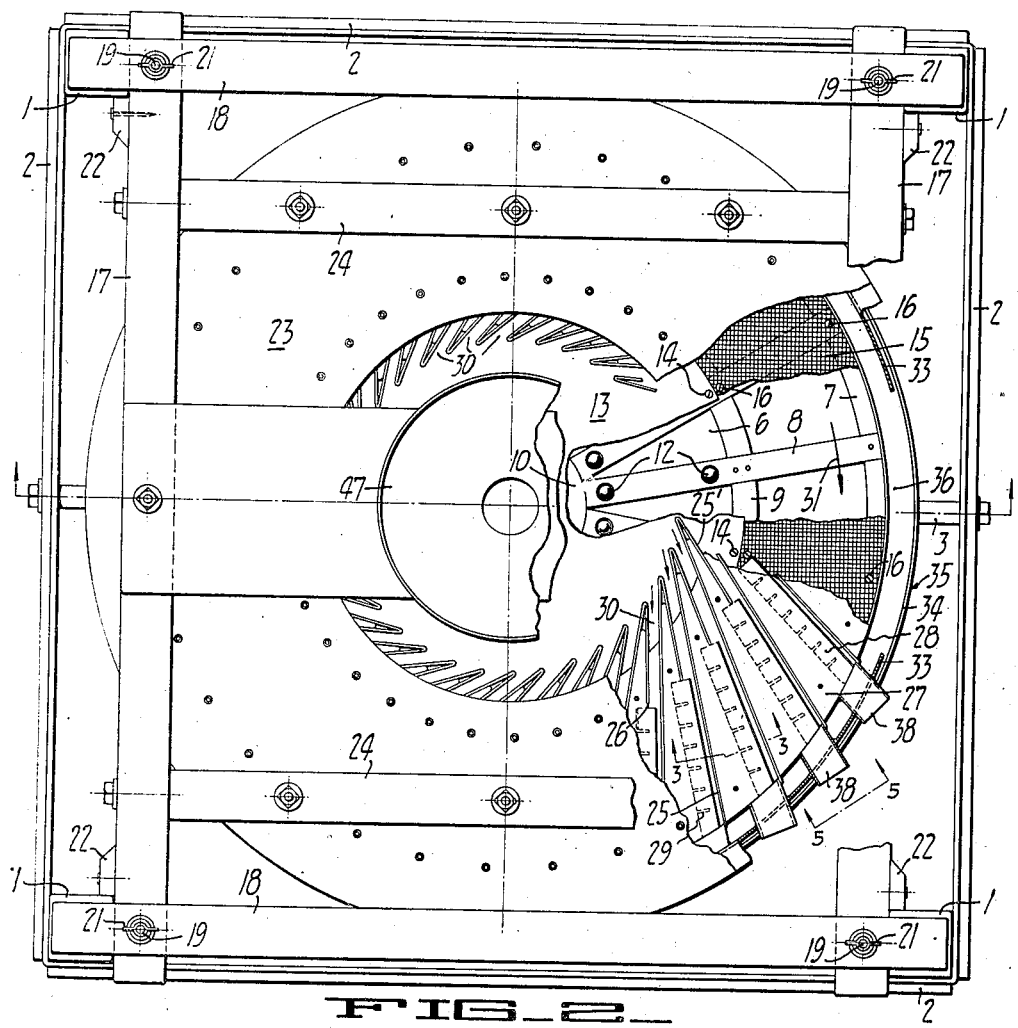
FIG_2_
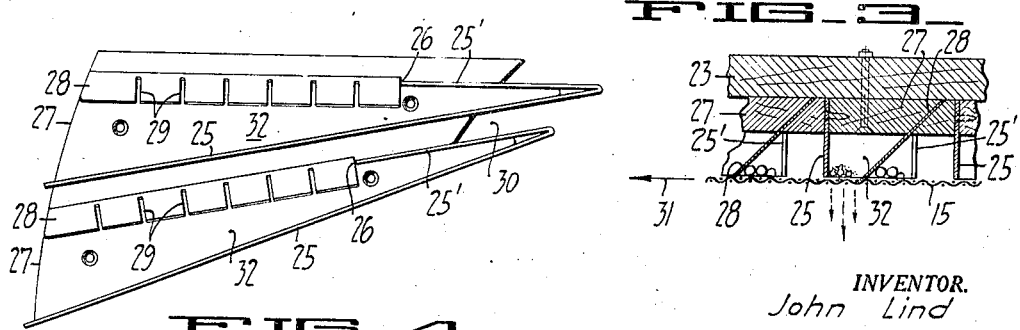
FIG_4_  FIG_3_
INVENTOR.
John Lind
BY Boyken & Mohler
ATTORNEYS.

Patented Jan. 14, 1941

2,228,833

UNITED STATES PATENT OFFICE 2,228,833

BEAN CLEANER

John Lind, San Luis Obispo, Calif., assignor to Southern Pacific Milling Company, San Francisco, Calif., a corporation of California Application May 27, 1938, Serial No. 210,412

1 Claim. (Cl. 209—12)

This invention relates to bean cleaning apparatus, and has for its objects improved means for quickly and efficiently removing foreign material from dried beans, such as pink beans, baby lima beans, etc. Other objects and advantages will appear in the description and drawings annexed hereto.

In the drawings,

Fig. 1 is a vertical sectional view of the apparatus.

Fig. 2 is a plan view of the apparatus showing certain parts broken away at various levels to illustrate the construction.

Fig. 3 is a fragmentary sectional view of a part of the device as seen along line 3—3 of Fig. 2.

Fig. 4 is a bottom plan view of several of the scraper devices that are disposed over the screen partially indicated in Fig. 2.

Fig. 5 is an enlarged fragmentary elevational view of a portion of the apparatus as seen from line 5—5 of Fig. 2.

The difficulties heretofore encountered in the efficient separation and removal of rocks, lumps of dirt, adobe and other impurities from dried beans have been largely due to the fact that the specific gravity of the foreign materials or impurities has so closely approximated that of the beans as to practically negative any success in separation thereof from the beans by use of air, and also many of the particles of foreign material are of substantially the same size as the beans, hence screening is not efficient. Other methods have been employed, utilizing air currents together with screening and also centrifugal separators, but in all such methods and apparatus either too large a percentage of good beans are generally separated with the foreign material or else the foreign material is not efficiently separated from the beans.

In the present apparatus and method, the beans and impurities, such as rocks, adobe, etc., that are mixed therewith, are continuously fed onto about the center of a revolving disk, the marginal portion of which is a relatively rough screen, and said beans and material are thrown outwardly on the disk by centrifugal force to between stationary guide strips positioned over the disk, which strips form the sides of said channels. Said channels extend from their inner ends outwardly generally in the direction of movement of the disk, the inner ends terminating adjacent the center of the disk. Thus the beans and foreign material continue to be urged generally radially outwardly on the disk, but at the same time are carried into engagement with one of the sides of each channel. The side of each channel so engaged by the beans and foreign material is flexible, and is supported at its upper edge with the lower edge engaging the screen. Since the beans are relatively smooth and hard without sharp corners, they will not cause flexing of said flexible side of the channel, but merely roll over on the screen and finally pass off the outer edge of the disk onto a chute or trough for carrying to any desired point, but the rocks and dirt, being irregular in shape or relatively soft, are caught by the screen and carried under the flexible strips into another channel from which they are ejected over the edge of the screen separate from the beans. Some of the lumps of earth are, of course, pulverized and pass through the screen, but in any event practically all of the impurities not previously removed by the present conventional apparatus, are removed by the device as above described in brief.

In detail, the apparatus illustrated in the drawings comprises a frame, including four corner posts 1 and opposed side frame members 2 connecting respectively between the posts of each pair of posts. A transverse brace 3 is secured at its ends to the frame members 2, centrally of the ends of the latter, and a bearing 4 centrally of the brace 3 rotatably supports a vertical shaft 5.

A horizontal circular plate 6 is centrally secured to the upper end of shaft 5 above bearing 4 and an annular, horizontally disposed, wheel-like member is secured to the upper side of plate 6. Said member has peripheral rim 7 spaced outwardly of the outer edges of plate 6, and radial arms 8 extend radially inwardly of said rim to over plate 6, which arms resemble the spokes of a wheel in arrangement. Adjacent pairs of arms are connected together at a point intermediate the ends of said arms by members 9 disposed generally concentric to the rim and for convenience of construction the rim 7 itself may be in separate sections that connect between the outer ends of the arms 8. The inner ends of the arms are secured to a central disk 10 which may be centrally apertured to receive a central boss 11 on plate 6 for properly positioning the wheel-like member as described, on said plate. The plate 6 and said wheel-like member may be secured together by any suitable means such as bolts 12.

Centrally positioned on the upper side of said wheel-like member is an imperforate circular disk 13 of metal or other suitable relatively hard material, which disk extends at its peripheral margins over the members 9 a distance of about half the width of the latter. Said disk 13 may be secured to the members 9 and central disk 10 by screws 14, or in any other suitable manner.

Around the outer edge of said disk 13, and extending from said edge to the peripheral side of rim 7 is a screen 15. A screen of 6 x 6 mesh .080 wire, double crimped, has been found highly satisfactory for accomplishing the desired results hereinafter described more in detail. The upper surface of said screen and disk 13 are disposed substantially in the same plane so that material on the disk may readily slide onto the screen over the junction between the screen and disk, and the screen is secured to the wheel-like member that mounts the disk by screws 16 or by any other suitable means.

Above disk 13 and screen 15 is a frame comprising parallel, horizontal frame members 17 suspended at their ends from transversely extending supporting members 18 by means of bolts 19, which bolts extend through members 18 and have wing nuts 21 at their upper ends engaging washers on members 18 whereby the members 17 may be raised or lowered by turning said nuts.

The members 18 are supported at their ends on the upper ends of posts 1 and guide blocks 22 secured to strips 17 respectively engage lateral sides of the posts for properly positioning the members on the posts and for preventing dislodgment of the ends of members 18 from the upper ends of said posts.

An annular generally disk-like member 23 is secured to the under side of members 17 and to transverse strips 24 that extend between said members 17 at points between members 18, and when the members 18 are supported at their ends on posts 1, the central axis of said member is in alignment with the central axis of disk 13 and shaft 5 while the inner circumferential edge of the member 23 is spaced radially inwardly relative to the outer edge of said disk 13. The outer peripheral edge of member 23 is terminated substantially over the outer peripheral edge of rim 7 of the wheel-like member heretofore described.

Secured to the member 23 and depending from the under side thereof is an annular row of horizontally elongated, vertically disposed strips 25 of metal or similar hard material (Figs. 2, 4), which strips extend tangentially of a circle concentric with the peripheral edge of disk 13, but spaced radially inwardly of the inner ends of said strips 25, and said strips 25 are doubled back on themselves with the bends at their inner ends, the bent back extension 25' of said strips being appreciably shorter than the main portion 25 and extending divergently from said ends and terminating at point 26. The inner ends of strips 25, when the member 23 is in position over the disk 13 and screen 15, extend over the outer margin of said disk 13, and the outer ends of said strips 25 terminate substantially at the peripheral outer edge of the screen 15. The free end of the bent back portion 25' terminates substantially at the junction between the disk 13 and screw 15. The upper margins of strips 25 are supported between elongated blocks 27 (Fig. 4), which blocks are slotted at their ends adjacent the portions 25' to receive said portions. The lower edges of the strips 25, 25', as above described, just clear the upper surface of disk 13 and screen 15 a sufficient distance so as not to scrape on the disk and screen, the clearance being preferably less than the diameter of the mesh openings in the screen 15 so that small particles on the screen that might otherwise be carried on the revolving screen past said strips, will fall through the screen.

Extending from the free end of portion 25' of strip 25 to the edge of the screen, is a flexible strip 28 of sheet material such as relatively stiff Celluloid, which strip is secured in a slot in block 27, which slot slantingly extends transversely through the block, as indicated best in Fig. 3, so as to support the strip in slanted position relative to the plane of the screen 15. Only the upper margin of strip 28 is supported in said block, and the portion of said strip depending therefrom is free to flex, and the lower edge of said strip yieldably engages the upper surface of screen 15. The direction of incline of said strips 28 from the upper edges thereof is in the direction of movement of screen 15, hence upon revolving of the screen, the lower edges of the strips 28 will scrape over the screen and the strips will yield according to the irregularity of the screen. In order to facilitate the yielding of the flexible strips 28, said strips are transversely slotted at spaced points 29 (Fig. 4) from their lower edges.

From the foregoing, and from the drawings, particularly Figs. 2, 4, it will be seen that material thrown outwardly on disk 13 will pass into spaces 30 between the inner ends of strips 25 and will pass outwardly between the portions 25' of strip 25 and strip 28 (on one side) and strip 25 on the other side toward the outer edge of screen 15. However, as the direction of rotation of the screen 15 is in the direction of arrow 31 (Fig. 2), the material on the screen will be carried against the strip 28. Since the beans are smooth, no appreciable resistance will be created by the beans against the flexible strip 28, but the rocks or lumps of dirt or the like, will not readily roll on the screen, but will be caught thereby and will cause sufficient flexing of the strip by their engagement therewith to be carried under the lower edges of the strips when they will pass into spaces 32 that lie between each strip 25 and the strip 28 that extends outwardly of the return portion 25' of said strip 25. The foreign material will then be carried against the strip 25, beneath which it cannot pass, hence its only egress from the screen is over its outer edge. Any foreign material pulverized by engagement with strip 28 or strip 25, will, of course, pass through the screen and downwardly between arms 8.

Depending from the outer marginal edge of the annular member 23 is a flange 33 which flange extends at its lower margin just within an annular flange 34 extending upwardly from the upper edges of the upper enlarged end of a funnel-like cone 35 (Fig. 1). The flange 33 is spaced outwardly of the outer edge of screen 15 thus providing a passage 36 for the foreign material ejected from over the outer ledge of said screen, whereby all of said foreign material so ejected, or such as passes through screen 15, will fall into the cone for conveyance through a spout 37 at the cone or funnel, to any desired point or for passing to another apparatus similar to the one just described for further separation in the event any good beans should be ejected with the foreign material.

From the outer ends of spaces 30, the beans pass into short conduits or channels 38 that pass across space 36 and which channels open into a space 39 outwardly of flange 34 and the beans ejected into said space will fall onto an inclined bottom 40 below said cone 35 for passage to any desired point for further handling of the beans in any manner that may be deemed desirable.

The screen 15 and disk 13 are revolved by rotation of shaft 5, which shaft carries a bevel gear 41 at its lower end above an adjustable bearing 42 in which the lower end of the shaft is rotatably supported. A bevel gear 43 on one end of shaft 44 that is supported in bearing 45 is rotated by any desired means such as a belt connection between pulley 46 and a motor (not shown) or by any conventional drive means whereby the screen will be revolved at a speed of about 50 R. P. M.

The material is fed onto disk 13 by any suitable means from a generally conical hopper 47 which may receive the material from a conduit 48 that extends from an elevator (not shown) or other conventional means used for such purpose.

Having described the invention, the claim made thereto is as follows:

In bean cleaning apparatus of the character described, a horizontally disposed, circular, rotary table, means for rotating said table about its central vertical axis, means for feeding beans or like material onto the central portion of said table, means over said table for separating undesirable foreign material and beans generally outwardly toward the outer edge of said table along separate paths of travel with the paths of the beans alternating with the paths of the foreign material upon rotation of said table, spaced means around said table arranged and adapted to conduct the beans from each of the paths of travel thereof away from the outer edge of said table, said table including a perforated screen of relatively coarse wire mesh adapted to pass foreign material therethrough of substantially smaller size than the beans, the major portion of said screen being suspended for free dropping of said last mentioned foreign material therethrough, and means spaced below the screen for catching and guiding material that passes through the screen to a point of discharge, said central portion being imperforate, and relatively smooth and said screen being annular in shape and extending around said central portion.

JOHN LIND.